United States Patent Office 2,809,277
Patented Oct. 8, 1957

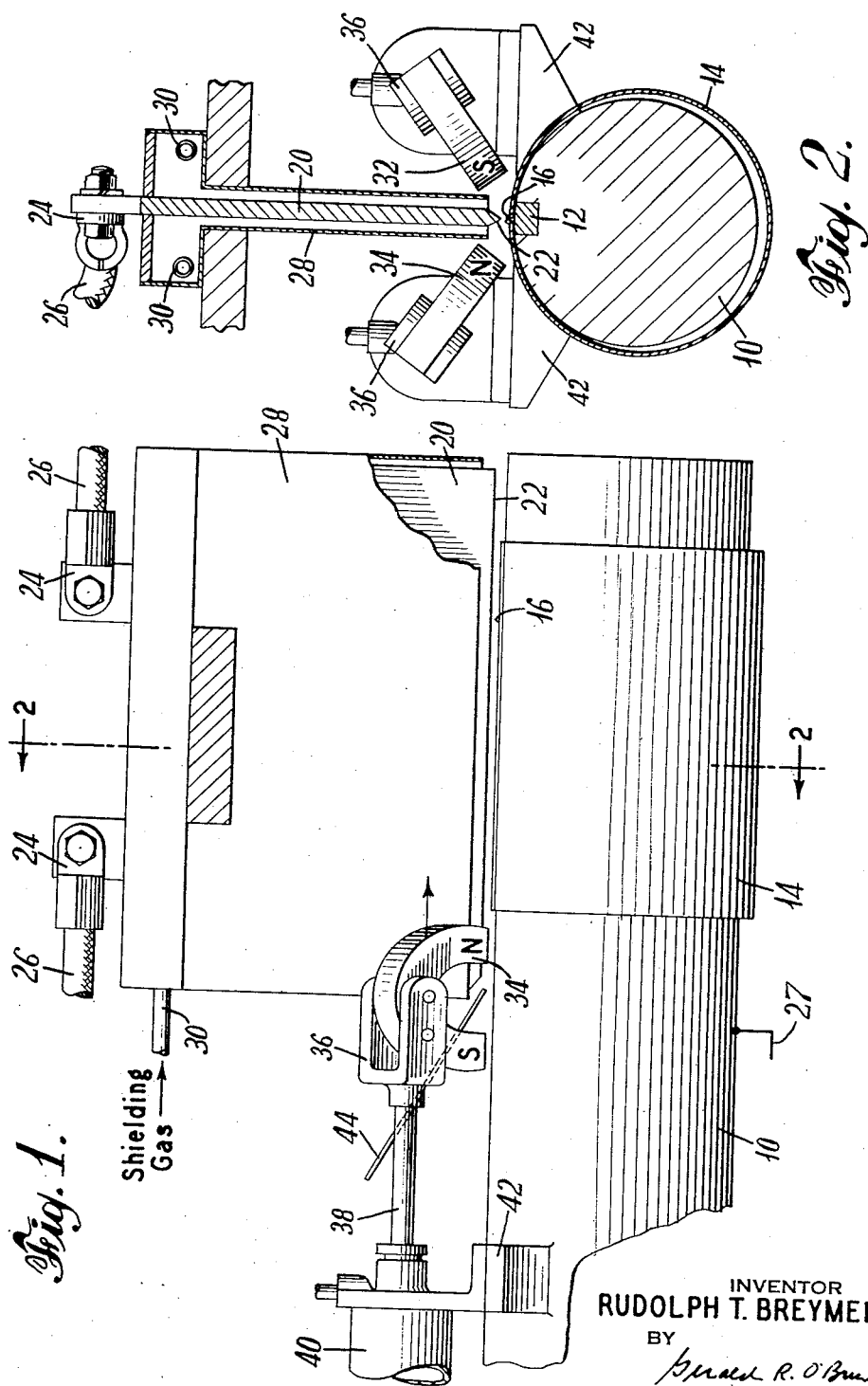

2,809,277

MAGNETICALLY-IMPELLED ARC WELDING
METHOD AND APPARATUS

Rudolph Thomas Breymeier, Oak Ridge, Tenn., assignor to Union Carbide Corporation, a corporation of New York Application August 23, 1955, Serial No. 530,170

10 Claims. (Cl. 219—123)

The present invention relates to a method and apparatus for magnetically-controlled electric arc welding and, more particularly, to such welding of thin metallic workpieces employing non-consumable metallic electrodes and inert gas shielding of the arc and welding zones.

In the various industries fabricating thin metallic workpieces into finished containers and the like, production is automatic with one forming or gaging operation following another in rapid succession. The production rate is, of course, high necessitating the carrying out of a specific operation in less than a maximum time interval, in many cases in the order to 0.10 second. One such industry is the can industry wherein production rates of the order of 400 cans per minute is standard. If electric fusion welding is to be incorporated in such a production operation, very high-speed methods and equipment must necessarily be employed together with welding currents in the order of 1,000 amperes, or even higher. Such welding requirements greatly exceed conditions encountered in conventional welding practice and many new problems are introduced when employing such high speeds and high welding currents.

Heretofore, a method has been proposed in which a gas-shielded thoriated tungsten electrode was moved, by mechanical means, at speeds in excess of 1,000 inches per minute along the seam to be welded. In order to produce a uniform weld it was necessary that the electrode move along the seam to be welded at a uniform velocity, a factor which was difficult to achieve at high welding speeds over the short welding lengths involved in that process. In addition, the movement of the electrode holder, together with its associated gas shielding means, resulted in mechanical limitations on the upper limits of welding speeds which could be achieved in such a process. Further, gas shielding was accomplished only in the vicinity of the moving electrode. While this process produced satisfactory welds of uniform quality at speeds up to somewhat in excess of 1,000 inches per minute, the problems encountered in rapidly moving the electrode and gas shielding assembly introduced mechanical limitations at substantially higher speeds.

Accordingly, it is the main object of the present invention to provide a method and apparatus for impelling an arc in the welding of thin metallic workpieces, wherein an elongated stationary electrode is employed and the arc is impelled along such electrode at high speeds and uniform velocity.

Other aims and advantages of the present invention will be apparent from the following description and appended claims.

In accordance with the present invention, a method is provided for the welding or fusing of thin metallic workpieces comprising, providing, in series with an electric power source and the workpiece, an elongated non-consumable stationary electrode having its lower edge positioned above and parallel to the seam to be welded, forming at one end of said electrode and said workpiece an arc, subjecting the arc to the influence of a transverse magnetic field moving in the direction to be welded to impel the arc between the electrode and the workpiece along the seam to be welded at a uniform velocity greater than 1,000 inches per minute. Concurrently with the welding operation, the arc and weld zone are shielded with an atmosphere of substantially inert gas in the manner well known to the prior gas shielded electric arc welding art to exclude atmospheric air contamination. Due to the high welding speeds and relatively short weld lengths employed, it has been found preferable to shield the area of the entire length of the electrode and weld zone during the entire welding operation, rather than to attempt to shield only the zone around the arc and the moving molten weld puddle.

By impelling the welding arc across the electrode and along the seam to be welded in accordance with the invention, extremely high welding speeds at uniform velocity can be attained. The method has been employed to weld thin metallic workpieces at speeds greater than 3,000 inches per minute. In theory, the upper limit of welding speed is limited only by the speed at which the magnetic field can be moved along the seam to be welded.

It has been found that arc ignition between the one end of the elongated stationary electrode and the workpiece, as well as arc extinction, may be carried out by any one of the three following methods: (1) employing an auxiliary electrode supplied with high-frequency from a spark-gap oscillator, or the like, (2) employing an auxiliary eletrode supplied with a single pulse of high-voltage current, or (3) by shortening the gap at the point in which it is desired to initiate the arc and superimposing a high-frequency voltage on the conductor to the electrode. It is, of course, to be understood that other suitable arc ignition procedures well known to the art may alternatively be employed.

The travelling magnetic field employed in the method of the present invention is best formed by providing, on opposite sides of the elongated electrode, magnetic poles of opposite polarity so that the magnetic flux generated is transverse to the welding arc as well as the direction of seam to be welded, thereby developing a resultant force on the arc in the direction to be welded. The means generating the travelling magnetic field are impelled along the electrode in the direction to be welded by any suitable drive means capable of developing speeds of the order of 3,000 inches per minute. The hydraulic driving system described hereinbelow is shown only by way of example, and any suitable drive means capable of attaining the high speeds required is suitable.

An embodiment of apparatus suitable for performing the welding method of the present invention is shown in the drawing, wherein:

Fig. 1 is a partial elevational view of said welding apparatus; and

Fig. 2 is a sectional view taken along the line 2—2 of Fig. 1.

Referring to the figures of the drawing, a mandrel 10 of stainless steel or the like, provided with a back-up bar 12 of copper or other suitable material, is provided for supporting the workpieces at the seam. The workpiece 14, such as formed can stock having a thickness preferably less than 0.05 inch, and having edges to be joined flanged as at 16, is supported on mandrel 10. An elongated metallic electrode 20 of copper or the like, having a lower chiseled edge 22 of tungsten inserted in the copper, is positioned above and in close alignment with the flanged edges 16 of the work 14 to be welded. Current is supplied to the electrode 20 through clamp 24 and conductor 26, and the welding circuit is completed through a suitable electric welding power source (not shown) and a conductor 27 to the workpiece 14, the mandrel 10, or the back-up bar 12. It is preferable that all portions of the lower edge of the electrode be substantially equally positioned from the work to provide a uniform spacing therebetween which will enable the arc to traverse the workpiece along the seam at a uniform speed under the influence of the travelling magnetic field. Should the spacing between electrode and workpiece vary excessively, the welding speed will not be uniform and may even result in the inability of the arc to traverse the full length of the electrode.

Surrounding the electrode is provided conduit means, including manifold 28, for the introduction of a stream of shielding gas about both sides of the electrode 20 and for discharging such streams around the entire length of the electrode and workpiece along the seam to be welded. Any suitable shielding gas known to the prior gas shielded electric arc welding art may be employed and is introduced into manifold 28 through inlet conduits 30.

Permanent magnets 32 and 34 are provided on opposite sides and near the lower end of electrode 20 in retaining arms 36. Such magnets, as shown, are of the horseshoe type and are arranged so that poles of opposite magnetic polarity are oppositely positioned across the space between the lower end of the electrode and the workpiece to be welded. Magnet retaining arms 36 are connected by rods 38 to a hydraulic drive mechanism 40, secured to mandrel 10 by arms 42, so as to drive permanent magnets 32 and 34 in synchronism across the work to be welded. The resultant travelling permanent magnetic field, having magnetic flux in a direction transverse to both the arc and direction of travel, produces a resultant force on the arc so as to move the arc between the electrode and the work along the seam to be welded. With the poles of the permanent magnets as shown in Fig. 2 of the drawing, the relationship is such as to create one magnetic field in front of and another of opposite direction behind the arc, thereby tending to maintain the arc stiff and in central alignment.

The strength of the magnetic field may be altered by varying the distance between the opposing poles of the two magnets which are oppositely positioned, thereby creating a sufficient field strength to meet the specific requirement which varying conditions exact. Such conditions may include the speed of arc travel desired, the amount of current employed, the position of the electrode, or the type of material to be welded.

Whereas permanent magnets are shown in the drawing and discussed hereinabove as the means for producing the travelling magnetic field of the invention, it is to be understood that electromagnets and the like may alternatively be employed to produce such field.

A high frequency spark electrode 44, of tungsten or the like, is provided and located at one end of the main electrode for initiating the welding arc.

It has been found that a two-pass weld may be accomplished, employing the method of the present invention, by supplying only a sufficient current to the weld on the initial pass with the first down sweep of the permanent magnet assembly, and fully welding the seam on the second pass with the return stroke of the permanent magnet assembly. In this manner, the arc can be sustained indefinitely by having the point at which the arc is struck as a common center for two separate workpieces, and employing automatic replacement of a completed workpiece with a new workpiece while the arc is traversing along and welding the other workpieces.

In an example of the welding method of the invention, welding speeds in excess of 3,000 inches per minute have been attained in the welding of 0.01-inch thick strips of flanged mild steel stock when employing a direct current of about 600 amperes and a welding voltage of about 20 volts. The magnetic field strengths developed by the travelling magnetic means employed were of the order of 800 gauss and a hydraulic system was employed for driving the travelling magnetic field generating assembly. The gas employed to shield the arc and welding zone was argon.

Welds have been made on a wide variety of materials having thicknesses less than 0.05 inch when operating with direct current connected for both reverse and straight polarity operation.

The method of the present invention has been observed to accomplish a considerable reduction in electrode loss over that obtained in the prior art process employing a conventional gas-shielded thoriated tungsten electrode which is rapidly impelled across the work by mechanical means. This is brought about by the employment of the elongated stationary electrode across which the arc moves, resulting in a considerable reduced deterioration due to lower energy concentration at any given point along the electrode.

What is claimed is:

1. The method of fusing thin metallic workpieces comprising, providing, in series with an electric power source and said workpiece, an elongated non-consumable stationary electrode having its lower end positioned above and parallel to the seam to be fused, forming at one end of said electrode and said workpiece an arc, subjecting said arc to the influence of a transverse magnetic field moving in the direction to be fused to impel said arc between said electrode and workpiece along said seam to be fused and concurrently shielding said arc and workpiece from the atmosphere.

2. In apparatus for fusing thin metallic workpieces employing an electric power source connected in series circuit arrangement with work-supporting back-up means and an elongated stationary non-consumable metal electrode positioned above and at all points substantially equidistant from said back-up means, means for striking an arc between one end of said electrode and said workpiece supported on said back-up means, and conduit means for supplying a stream of shielding gas along said electrode and workpiece seam to be fused to provide a gas shielded arc, the improvement which comprises means for generating a transverse magnetic field in proximity with said shielded arc and mounted to be moved to impel said arc in the direction to be fused.

3. Apparatus in accordance with claim 2, wherein said means for generating a magnetic field comprises permanent magnets.

4. Apparatus in accordance with claim 2, wherein said means for generating a magnetic field comprises electromagnets.

5. Apparatus in accordance with claim 2, wherein said elongated stationary electrode comprises a copper bar having a lower edge of thoriated tungsten.

6. Apparatus in accordance with claim 5, wherein said shielding gas conduit means surrounds said stationary electrode and is adapted to discharge a stream of shielding gas on both sides of said electrode along the entire length of said electrode.

7. In apparatus for fusing thin metallic workpieces employing an electric power source connected in series circuit arrangement with work-supporting back-up means and an elongated stationary non-consumable metal electrode positioned above and at all points substantially equidistant from said back-up means, means for striking an arc between one end of said electrode and said workpiece supported in said back-up means, and conduit means for supplying a stream of shielding gas along said arc and workpiece seam to be fused to provide a gas shielded arc, the improvement which comprises at least one permanent magnet positioned on each side of said elongated stationary electrode in magnetic field opposition in proximity with said gas shielded arc and mounted to be moved in the direction to be fused to impel said gas shielded arc at speeds in excess of 1,000 inches per minute.

8. Apparatus in accordance with claim 7, wherein said elongated stationary electrode comprises a copper bar having a lower edge of thoriated tungsten.

9. Apparatus in accordance with claim 8, wherein said shielding gas conduit means surrounds said stationary electrode and is adapted to discharge a stream of shielding gas on both sides of said electrode along the entire length of said electrode.

10. Apparatus for fusion welding a seam in metal work including an electric power source in series circuit with said work and an elongated stationarily supported nonconsumable electrode positioned above and with its arcing edge at all points substantially equidistant from said work, means for striking an arc between one end of said electrode and said workpiece, conduit means for supplying a stream of shielding gas about said electrode and the seam to be fused to provide a gas shielded arc, and magnet means having opposed poles for producing a magnetic field transversely of and in proximity with said shielded arc for impelling the arc longitudinally of said seam and means for moving said magnet means longitudinally of the seam to impel the arc therealong.

References Cited in the file of this patent

UNITED STATES PATENTS

| | | |
|---|---|---|
| 388,246 | Bernados | Aug. 21, 1888 |
| 483,425 | Coffin | Sept. 27, 1892 |
| 1,176,614 | Stanley | Mar. 21, 1916 |
| 1,524,714 | Kjekstad | Feb. 3, 1925 |
| 1,886,524 | Chapman | Nov. 8, 1932 |
| 2,001,179 | Brugge | May 14, 1935 |
| 2,640,135 | Cobine | May 26, 1953 |

FOREIGN PATENTS

| | | |
|---|---|---|
| 645,938 | Germany | June 5, 1937 |